United States Patent
Cavaliere et al.

(10) Patent No.: US 11,243,356 B2
(45) Date of Patent: Feb. 8, 2022

(54) CHROMATIC DISPERSION COMPENSATION

(71) Applicant: Telefonaktiebolaget LM Ericsson (publ), Stockholm (SE)

(72) Inventors: Fabio Cavaliere, Pisa (IT); Marco Romagnoli, Pisa (IT); Vito Sorianello, Pisa (IT)

(73) Assignee: Telefonaktiebolaget LM Ericsson (publ)

( * ) Notice: Subject to any disclaimer, the term of this patent is extended or adjusted under 35 U.S.C. 154(b) by 0 days.

(21) Appl. No.: 16/630,497

(22) PCT Filed: Jul. 21, 2017

(86) PCT No.: PCT/EP2017/068473
§ 371 (c)(1),
(2) Date: Jan. 13, 2020

(87) PCT Pub. No.: WO2019/015779
PCT Pub. Date: Jan. 24, 2019

(65) Prior Publication Data
US 2020/0150346 A1    May 14, 2020

(51) Int. Cl.
*G02B 6/293* (2006.01)
*G02B 6/12* (2006.01)
(Continued)

(52) U.S. Cl.
CPC ..... *G02B 6/29392* (2013.01); *G02B 6/12004* (2013.01); *G02B 6/12007* (2013.01);
(Continued)

(58) Field of Classification Search
CPC ............ G02B 6/29392; G02B 6/12004; G02B 6/12007; G02B 6/29343; H04B 10/58; H04B 10/505
See application file for complete search history.

(56) References Cited

U.S. PATENT DOCUMENTS 5,608,562 A * 3/1997 Delavaux ........... G02B 6/29376
398/148
5,636,046 A * 6/1997 Ishikawa ............ G02B 6/29377
385/123

(Continued)

FOREIGN PATENT DOCUMENTS

DE       19950132 A1    4/2001
EP        1065813 A2    1/2001
(Continued)

OTHER PUBLICATIONS

Boffi, P. et al., "Stable 100-Gb/s POLMUX-DQPSK Transmission With Automatic Polarization Stabilization", IEEE Photonics Technology Letters, vol. 21 No. 11, Jun. 1, 2009, pp. 745-747, IEEE.
(Continued)

*Primary Examiner* — Mina M Shalaby
(74) *Attorney, Agent, or Firm* — Coats & Bennett, PLLD

(57) ABSTRACT

A transmitter (1) is configured to transmit an optical signal, the transmitter comprising an optical dispersion compensator (10) configured to compensate for chromatic dispersion of the optical signal. The optical dispersion compensator comprises a plurality of delay elements (20; 40). The plurality of delay elements (20; 40) have a combined response providing a delay to the transmitted optical signal which varies with frequency.

18 Claims, 8 Drawing Sheets

(51) Int. Cl.
   *H04B 10/50* (2013.01)
   *H04B 10/58* (2013.01)
(52) U.S. Cl.
   CPC ....... *G02B 6/29343* (2013.01); *H04B 10/505* (2013.01); *H04B 10/58* (2013.01)

(56) References Cited

U.S. PATENT DOCUMENTS

| | | | |
|---|---|---|---|
| 5,717,510 A * | 2/1998 | Ishikawa | H04B 10/0795 398/147 |
| 6,229,631 B1 * | 5/2001 | Sato | H04B 10/0775 398/30 |
| 6,320,687 B1 * | 11/2001 | Ishikawa | H04B 10/2519 398/147 |
| 6,661,976 B1 | 12/2003 | Gnauck et al. | |
| 6,871,024 B2 * | 3/2005 | Nishimoto | H04B 10/25133 398/147 |
| 7,616,893 B2 * | 11/2009 | Ooi | H04J 14/0201 398/147 |
| 7,653,310 B2 * | 1/2010 | Sekine | H04J 14/02 398/81 |
| 10,225,016 B1 * | 3/2019 | Khaleghi | H04J 14/0256 |
| 2002/0191906 A1 | 12/2002 | Price et al. | |
| 2003/0076570 A1 | 4/2003 | Schemmann et al. | |
| 2004/0208619 A1 | 10/2004 | Li et al. | |
| 2004/0258181 A1 | 12/2004 | Popescu et al. | |
| 2005/0008364 A1 | 1/2005 | Roberts et al. | |
| 2005/0058397 A1 | 3/2005 | Doerr | |
| 2005/0226613 A1 * | 10/2005 | Raddatz | H04B 10/25133 398/27 |
| 2005/0226629 A1 * | 10/2005 | Ooi | H04B 10/25133 398/147 |
| 2008/0056726 A1 * | 3/2008 | Sugiya | H04B 10/25133 398/147 |
| 2008/0151377 A1 * | 6/2008 | Sekine | G02B 6/29395 359/615 |
| 2008/0279563 A1 * | 11/2008 | Shu | H04B 10/2513 398/147 |
| 2008/0279565 A1 * | 11/2008 | Shu | H04B 10/25133 398/158 |
| 2009/0060523 A1 * | 3/2009 | Qiao | H04B 10/07951 398/147 |
| 2009/0067783 A1 * | 3/2009 | Webb | H04B 10/25133 385/27 |
| 2009/0080901 A1 * | 3/2009 | Miura | G02B 6/29358 398/158 |
| 2009/0202248 A1 * | 8/2009 | Zhang | H04B 10/25133 398/81 |
| 2009/0238571 A1 * | 9/2009 | Nakamura | H04J 14/0227 398/97 |
| 2009/0310975 A1 * | 12/2009 | Shu | H04B 10/2513 398/147 |
| 2010/0329695 A1 * | 12/2010 | Sridhar | H04B 10/25253 398/159 |
| 2011/0058820 A1 * | 3/2011 | Ooi | H04B 10/2513 398/147 |
| 2011/0176805 A1 * | 7/2011 | Mahlab | H04B 10/25133 398/48 |
| 2011/0222864 A1 * | 9/2011 | Vassilieva | H04B 10/2513 398/158 |
| 2012/0039616 A1 * | 2/2012 | Striegler | H04B 10/2519 398/149 |
| 2012/0128362 A1 * | 5/2012 | Nakamoto | H04B 10/2513 398/81 |
| 2014/0079111 A1 * | 3/2014 | Hui | H04L 25/03044 375/234 |
| 2018/0205461 A1 * | 7/2018 | Alfiad | H04B 10/2513 |
| 2019/0020109 A1 * | 1/2019 | Puleri | H01Q 3/2676 |
| 2019/0349092 A1 * | 11/2019 | Qiao | H04B 10/07953 |
| 2020/0150346 A1 * | 5/2020 | Cavaliere | H04B 10/58 |

FOREIGN PATENT DOCUMENTS

| | | |
|---|---|---|
| EP | 1158326 A2 | 11/2001 |
| EP | 1628150 A1 | 2/2006 |
| EP | 2937721 A1 | 10/2015 |
| GB | 2421649 A | 12/2004 |
| WO | 2008078147 A1 | 7/2008 |
| WO | 2017144187 A1 | 8/2017 |
| WO | 2018028784 A1 | 2/2018 |
| WO | 2018108235 A1 | 6/2018 |

OTHER PUBLICATIONS

Heismann, F., "Analysis of a Reset-Free Polarization Controller for Fast Automatic Polarization Stabilization in Fiber-Optic Transmission Systems", Journal of Lightwave Technology, vol. 12 No. 4, Apr. 1, 1994, pp. 690-699, IEEE.

Morsy-Osman, M. et al., "1λ × 224 Gb/s 10 km Transmission of Polarization Division Multiplexed PAM-4 Signals Using 1.3 μm SiP Intensity Modulator and a Direct-Detection MIMO-Based Receiver", 2014 The European Conference on Optical Communications (ECOC), Sep. 21, 2014, pp. 1-3, IEEE.

D'Errico, A. et al., "Double-Pass PMF-Based Optical Circuit Enhancing 40 Gbit/s Chromatic Dispersion Tolerance", 2008 34th European Conference on Optical Communication (ECOC), Sep. 21, 2008, pp. 1-2, IEEE.

Forestieri, E. et al., "Novel Optical Line Codes Tolerant to Fiber Chromatic Dispersion", Journal of Lightwave Technology, vol. 19 No. 11, Nov. 1, 2001, pp. 1675-1684, IEEE.

Shankar, H., "Duobinary Modulation For Optical Systems", Jun. 1, 2006, p. 1-10, Research Gate.

Martinelli, M. et al., "Polarization Stabilization in Optical Communications Systems", Journal of Lightwave Technology, vol. 24 No. 11, Nov. 1, 2006, pp. 4172-4183, IEEE.

Chaichuay, C. et al., "Multi-Stage Ring Resonator All-Pass Filters for Dispersion Compensation", Optica Applicata, vol. XXXIX No. 2, Jan. 1, 2009, pp. 277-286, Optica Applicata.

Madsen, C. et al., "Multistage Dispersion Compensator Using Ring Resonators", Optics Letters, vol. 24 No. 22, Nov. 15, 1999, pp. 1555-1557, Optical Society of America.

Madsen, C. et al., "An Integrated Tunable Chromatic Dispersion Compensator for 40 Gb/s NRZ and CSRZ", Optical Fiber Communications Conference Postdeadline Papers, Jan. 1, 2002, pp. FD9-1-FD9-3, Optical Society of America.

* cited by examiner

CHROMATIC DISPERSION COMPENSATION

TECHNICAL FIELD

The disclosure relates to a transmitter and method for transmitting an optical signal with compensation of chromatic dispersion, and a controller for controlling transmitting an optical signal with compensation of chromatic dispersion.

BACKGROUND

Coherent optical interfaces used in long-haul 10 Gbit/s DWDM systems have the capability to compensate for propagation distortions in optical fiber by means of digital signal processing implemented at the receiver. Coherent optical interfaces are high performing but too expensive for metropolitan-wide access and aggregation networks.

Cost effective direct detection interfaces are used instead for point-to-point connections over such short distances, e.g. up to tens of kilometers. This type of interface may transmit in the wavelength region around 1310 nm, where an optical fiber's chromatic dispersion is low and does not need to be compensated for.

DWDM networks offer some features that could be exploited also in the metro-access and aggregation segment, for example: high aggregate capacity, compatibility with various network topologies (mesh, tree, ring, bus), possibility to offload switches and routers from traffic not processed locally, low latency, service segregation, etc.

For this purpose, it would be desirable to extend the operation of direct detection interfaces in the 1550 nm region, where DWDM components are largely available. However, at such wavelengths the chromatic dispersion of an optical fiber is relatively high and needs to be compensated for.

Compensation for chromatic dispersion of an optical fiber is known to be carried out in various ways. For example, the compensation may utilize:
1. In line optical dispersion compensation devices, based on dispersion compensating fiber (DCF), Fiber Bragg gratings (FBG), or liquid crystals (LC). This may require a compensating module at each fiber span, requiring additional optical amplifiers; this leads to additional costs that are unacceptable in the metro access segment. The modules are different at each span, depending on the span length; DCF and FBG are designed to compensate for fixed fiber lengths so that many variants (e.g. from 10 to 100 km, with 10 km of granularity) need to be managed.
2. Electronic equalization, implemented in a digital signal processor at the receiver. The electronic equalization consumes power (tens of Watts), introduces latency. The electronic equalization is carried out after an optical detector, e.g. photodiode, on the received electronic signal.
3. Electronic pre-distortion, implemented in a digital signal processor at the receiver. Electronic pre-distortion is implemented at the transmitter, by applying a pre-distortion to an optical modulator. The electronic pre-distortion uses a digital signal processor between a bit source and the modulator, to emulate a system whose response inverts that of the fiber link. This aims to recover at the receiver the transmitted bits. This solution requires high speed, high accuracy and energy consuming digital to analog converters (DAC), making it difficult to apply and expensive in particular for bit rates above 10 Gbit/s
4. Optical dispersion compensating devices integrated at the receiver. An optical dispersion compensator (ODC) may be located at the receiver, after a polarization controller and prior to a photodiode detector. The polarization controller introduces some complexity, due to the need of tracking variations of the polarization state through control mechanisms. A dual polarization scheme avoids the need of implementing control mechanisms, by using dual polarization grating couplers (DP GC) to split the signal in two orthogonal polarization states, individually compensate the dispersion on the two states, and the recombine them. The main drawbacks are the additional loss and bandwidth limitations introduced by the DP GCs.
5. Dispersion tolerant modulation formats. Direct detection modulation formats which are inherently resilient to the chromatic dispersion can be designed, for example, Pulse Amplitude Modulation-4 (PAM4) or Discrete multitone (DMT). PAM-4 and DMT require digital to analog conversion at the transmitter and present a significant sensitivity penalty, compared to on-off keying transmission.

SUMMARY

A first aspect provides a transmitter configured to transmit an optical signal, the transmitter comprising an optical dispersion compensator configured to compensate for chromatic dispersion of the optical signal. The optical dispersion compensator comprises a plurality of delay elements. The plurality of delay elements have a combined response providing a delay to the transmitted optical signal which varies with frequency.

Thus, an effective dispersion compensation is provided for an optical signal which will be transmitted through a chromatically dispersive medium, e.g. an optical fiber. In some aspects, the location of the optical dispersion compensator at the transmitter provides for the arrangement of the optical dispersion compensator to be effectively optimized for a polarization of the optical signal.

Optionally, a said delay element is a micro-ring resonator.

Optionally, a said delay element is configured to apply a delay to a sub-band of the optical signal.

Optionally, the optical dispersion compensator is configured to apply a delay to the optical signal which varies substantially linearly with frequency.

Optionally, a propagation mode of the optical dispersion compensator is aligned in polarization to an optical light source providing an optical signal to the optical dispersion compensator.

Optionally, the optical dispersion compensator comprises a plurality of optical dispersion compensator units. Each optical dispersion compensator unit comprises a plurality of said delay elements, and the optical dispersion compensator is configured to selectively activate one or more of the optical dispersion compensator units.

Optionally, the optical dispersion compensator comprises a first switch associated with each optical dispersion compensator unit, wherein the first switch is configured to be controllable to couple the optical signal with the associated optical dispersion compensator unit to activate the optical dispersion compensator unit.

Optionally, the first switch is configured to selectively couple the optical signal with the associated optical dispersion compensator unit to activate the optical dispersion compensator unit or to couple the optical signal to an optical bus to bypass the optical dispersion compensator unit.

Optionally, the transmitter further comprises one or more of: an optical light source, a modulator and an amplifier.

Optionally, the optical dispersion compensator is implemented in an integrated circuit, and optionally, one or more of: an optical light source, a modulator and an amplifier are implemented in the same integrated circuit.

A second aspect provides a method of transmitting an optical signal with optical dispersion compensation, comprising configuring an optical dispersion compensator to provide a determined amount of dispersion compensation. The optical dispersion compensator comprises a plurality of delay elements, and applying an optical signal from an optical light source to the optical dispersion compensator. The method comprises dispersion compensating the optical signal in the optical dispersion compensator with the plurality of delay elements having a combined response to provide a delay to the transmitted optical signal which varies with frequency; and transmitting the optical signal including dispersion compensation from the optical dispersion compensator.

Optionally, a said delay element applies a delay to a sub-band of the optical signal.

Optionally, a said delay element is a micro-ring resonator.

Optionally, the optical dispersion compensator applies a delay to the optical signal which varies substantially linearly with frequency.

Optionally, the optical dispersion compensator comprises a plurality of optical dispersion compensator units, wherein each optical dispersion compensator unit comprises a plurality of said delay elements, and configuring the optical dispersion compensator comprises selectively activating one or more of the optical dispersion compensator units to provide the determined amount of dispersion compensation.

Optionally, the selectively activating one or more of the optical dispersion compensator units comprises controlling a first switch associated with each optical dispersion compensator unit, wherein the first switch is controlled to couple the optical signal with the associated optical dispersion compensator unit to activate the optical dispersion compensator unit.

A third aspect provides a controller configured to control a transmitter configured to transmit an optical signal, the transmitter comprising an optical dispersion compensator configured to compensate for chromatic dispersion of the optical signal, the controller comprising processing circuitry. The processing circuitry is configured to cause the controller to configure a dispersion compensator in the transmitter to provide a determined amount of dispersion compensation. The dispersion compensator comprises a plurality of delay elements. The controller is configured to control applying an optical signal from an optical light source to the dispersion compensator for dispersion compensating the optical signal in the dispersion compensator. The plurality of delay elements have a combined response to provide a delay to the transmitted optical signal which varies with frequency. The controller is configured to control transmitting the optical signal including dispersion compensation from the dispersion compensator.

A fourth aspect provides a method of a controller configured to control a transmitter configured to transmit an optical signal, the transmitter comprising an optical dispersion compensator configured to compensate for chromatic dispersion of the optical signal, the controller comprising processing circuitry. The processing circuitry is configured to cause the controller to configure a dispersion compensator in the transmitter to provide a determined amount of dispersion compensation. The dispersion compensator comprises a plurality of delay elements, wherein the plurality of delay elements have a combined response to provide a delay to the transmitted optical signal which varies with frequency. The method comprises controlling applying an optical signal from an optical light source to the dispersion compensator for dispersion compensating the optical signal in the dispersion compensator; and controlling transmitting the optical signal including dispersion compensation from the dispersion compensator.

A fifth aspect provides a computer program product comprising a computer program for a controller controlling a transmitter configured to transmit an optical signal and compensate for chromatic dispersion of the optical signal. The computer program comprising computer code which, when run on processing circuitry of the controller, causes the controller to configure a dispersion compensator in the transmitter to provide a determined amount of dispersion compensation. The dispersion compensator comprises a plurality of delay elements, wherein the plurality of delay elements have a combined response to provide a delay to the transmitted optical signal which varies with frequency. The controller is caused to control applying an optical signal from an optical light source to the dispersion compensator for dispersion compensating the optical signal in the dispersion compensator; and control transmitting the optical signal including dispersion compensation from the dispersion compensator.

BRIEF DESCRIPTION OF THE DRAWINGS

Embodiments of the disclosure will now be described, by way of example only, with reference to the figures, in which.

DETAILED DESCRIPTION

Figure 1:
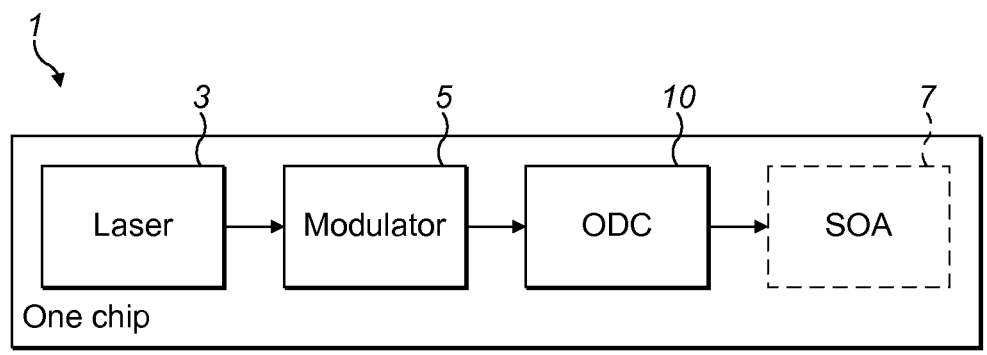
FIG. 1 schematically illustrates a transmitter in accordance with an embodiment.

FIG. 1 shows a transmitter 1 configured to transmit an optical signal, for example, over an optical communications network (not shown). The transmitter 1 may be a part of a radio access network or metro network, e.g. as a part of a network node. The optical communications network may comprise one or more optical fiber, and in some examples the transmitter 1 is referred to as transmitting over an optical fiber.

For example, the transmitter 1 may be a part of a transmitter of a 100 Gbit/s optical transmission system. The disclosure enables the cost effective implementation of high speed interfaces, for example using a receiver implementing direct detection. In some examples, the transmitter 1 is used in a fronthaul network. For example, the transmitter is a transmitter of a remote radio unit and/or a baseband processing unit.

The transmitter 1 comprises an optical light source 3, for example, a laser. In some examples, the laser emits light on a known linear polarization state, which avoids the need for a dual polarization design or a polarization controller.

The transmitter 1 further comprises a modulator 5. The modulator 5 may be configured to modulate light generated by the optical light source or may be configured to directly control the optical light source to generate a modulated optical data signal, also referred to as an optical signal. The modulator 5 receives data to be encoded in the optical data signal. For example, the modulator 5 may be a Mach-Zehnder modulator.

The transmitter 1 comprises an optical dispersion compensator 10. The dispersion compensator 10 is configured to compensate for dispersion which is expected to be introduced into the optical signal by an optical fiber or other transmission medium along which the optical signal is transmitted. The dispersion may be considered as an introduction of a time delay to the optical signal which is dependent on frequency. The time delay is a result of the velocity of the optical signal being dependent on the frequency in the dispersive transmission medium. The dispersion compensator 10 is configured to compensate for the expected introduced time delay. For example, the dispersion compensator 10 is configured to add a further time delay, so that the total time delay from both the transmission medium and the dispersion compensator 10 is substantially independent of frequency when received at a receiver. The optical dispersion compensator 10 may be considered as a chromatic dispersion compensator.

The disclosure uses "dispersion compensation" as a term to explain the features. It will be understood that since the apparatus and method relate to a transmitter (i.e. at the point of transmission), the dispersion has not yet occurred. The dispersion is determined to be introduced during the subsequent transmission through a dispersive medium, e.g. optical fiber. Thus, the dispersion compensation is not a reaction to an introduced dispersion, but a proactive control of the optical signal prior to dispersion.

Example implementations of the optical dispersion compensator 10 are described in detail below.

The transmitter 1 optionally comprises a Semiconductor Optical Amplifier, SOA, 7. The SOA 7 may be used to compensate for power loss due to the optical dispersion compensator 10 or to increase the transmitter power. The SOA 7 is optional, and may not be included in an alternative example of the transmitter 1.

The transmitter 1 may be, or form part of, a semiconductor photonics circuit. In this example, the light source 3, modulator 5, optical dispersion compensator 10 and, if present, the SOA 7 are on the same chip, which may be considered as a hybrid chip. As such, the transmitter 1 is a single integrated photonics device or circuit. For example, the modulator 5 and ODC 7 may be realized in Silicon Nitride. The light source 3 and SOA 7, which function as gain blocks, may utilize a III-V material, e.g. Indium Phosphide. Thus, the transmitter 1 is a single polarization transmitter where all the components are part of the same semiconductor photonics circuit or chip. The optical dispersion compensator 10 is integrated at the transmitter 1, i.e. an integrated part of the transmitter 1. For any example, the transmitter may be implemented as a silicon photonics device. As such, one or more wavelengths are polarization aligned, since the silicon photonic device generates a single polarization, and all the wavelengths will be TE-aligned.

In an example, the optical dispersion compensator 10 is based on a plurality of delay elements, for example, micro-ring resonators. The micro-ring resonators may be constructed in a semiconductor material, e.g. silicon nitride. The characteristics of the micro-ring resonators, e.g. radius and coupling coefficient to the waveguide are designed, and may be thermally tuned, to match the fiber length over which the optical signal is expected to be transmitted. The optical dispersion compensator 10 is configured to compensate for optical dispersion, for example, in the frequencies of a (D)WDM grid. As such, the optical dispersion compensator may be considered as configured to include an amount of dispersion compensation. The use of Silicon Nitride allows the realization of relatively large micro-ring resonators used for the optical dispersion compensator 10 at an acceptable loss. The relatively large waveguides of the optical dispersion compensator allow the manufacturing process to be more repeatable, leading to improved yield and performance control.

Examples of the disclosure provide an optical transmitter for one or a plurality of wavelength division multiplexed channels. An optical dispersion compensator is integrated with channel modulators in the same integrated circuit, i.e. chipset. The optical dispersion compensator has a main linearly polarized propagation mode. The polarization state of all channels' light sources is aligned to that mode. In some examples, the dispersion compensator frequency response is periodic and its period is equal to the channel frequency spacing.

In some aspects, the optical dispersion compensator 10 has a periodic frequency response, with a period equal to the frequency spacing of DWDM frequency grid. In this example, one optical dispersion compensator 10 is able to provide chromatic dispersion compensation for all of the plurality of channels, which may be useful in combination with a tunable laser.

The optical dispersion compensator 10 is configured to provide for chromatic dispersion compensation for a particular link, which is determined or known to introduce a particular chromatic dispersion. The dispersion may be considered as introduced by the length of the link and/or a type of the optical fiber used for the link. The optical dispersion compensator 10 may be considered as providing a compensation length. The value of the compensation provided may be adjusted according to the expected compensation required for the fiber link on which the transmission will take place. For example, the adjustment may be carried out via software, as described in more detail below.

Figure 2:
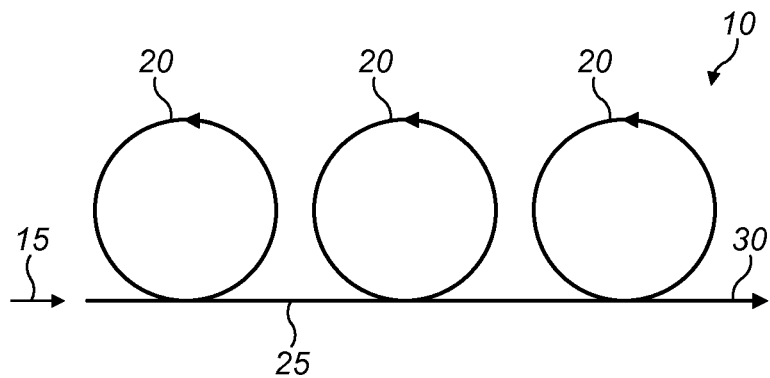
FIG. 2 schematically illustrates an example of an optical dispersion compensator in accordance with an embodiment.

FIG. 2 shows an example implementation of the dispersion compensator 10. The dispersion compensator 10 comprises an input 15 configured to receive an optical signal from the light source 3 (e.g. via the modulator 5). For example, the input 15 is configured to receive a single polarization optical signal. The optical signal may comprise one or more wavelengths.

The dispersion compensator 10 comprises a set of a plurality of delay elements 20. In this example, each delay element 20 is a micro-ring resonator. The delay elements 20 are each coupled to an optical bus 25. The input 15 provides the optical signal onto the optical bus 25, for example, from the light source 3 (e.g. via the modulator 5). The optical bus 25 has an output 30, which in some examples is the output of the dispersion compensator 10. The output 30 is configured to output the optical signal on which dispersion compensation has been carried out.

The optical bus 25 is arranged such that an input signal is coupled to each of the plurality of delay elements 20. The plurality of delay elements 40 may be considered as connected in parallel to the optical bus 45. Thus, an input signal is delayed by all of the delay elements 20, i.e. micro-ring resonators.

The plurality of delay elements 20 are each configured to provide a time delay to a different frequency range of the optical signal. Each frequency range may be considered as a sub-band of the optical signal. In some aspects, the frequency range response of each delay element may be considered as a sub-band of the whole target compensation bandwidth. The frequency ranges of two or more of the delay elements 20 may overlap. As such, the sub-bands of the plurality of delay elements 20 overlap in frequency. In some examples, a primary or main time delay introduced by each delay element 20 is different. Thus, the optical signal undergoes a time delay across a wide frequency range. The time delay provided by the set of delay elements 20 may be configured to be dependent on frequency, i.e. since different delay elements 20 provide the delay for different frequencies.

Figure 3:
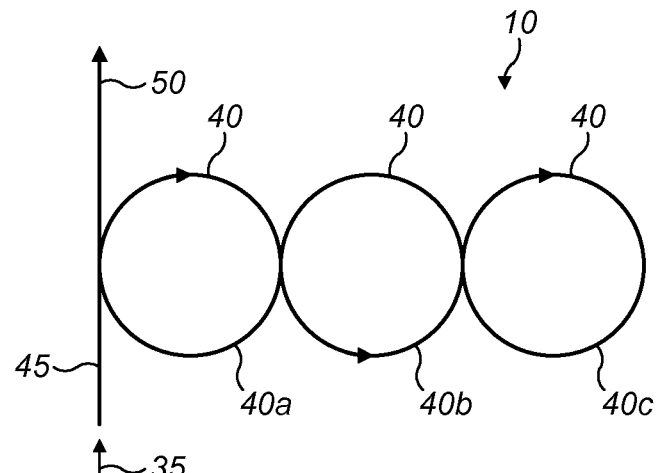
FIG. 3 schematically illustrates a further example of an optical dispersion compensator in accordance with an embodiment.

FIG. 3 shows a further example of dispersion compensator 10. In this example, the dispersion compensator 10 comprises a set of a plurality of delay elements 40. The delay elements 40 are in a different arrangement than the delay elements 20 described in FIG. 2.

As described above, each delay element 40 may be a micro-ring resonator. A first delay element 40a is coupled to an optical bus 45. The optical bus 45 has an input 35 configured to receive an optical signal, e.g. from the light source 3 (e.g. via the modulator 5). The optical bus 45 has an output 50, configured to output the optical signal on which dispersion compensation has been carried out.

The first delay element 40a is coupled to a second delay element 40b. As such, the second delay element 40b is not directly coupled to the optical bus 45. The second delay element 40b is only coupled via the first delay element 40a. In this example, a third delay element 40c is coupled to (and only to) the second delay element 40b. Thus, a plurality of delay elements 40a, 40b, 40c may be considered as connected in series to the optical bus 45. An optical signal travelling along the optical bus 45 from the input 35 is coupled to enter the first delay element 40a.

The first delay element 40a introduces a first time delay on a first frequency range (i.e. sub-band of the whole target compensation bandwidth). The optical signal is coupled into the second delay element 40b, in this case from the first delay element 40a, where a second time delay is introduced on a second frequency range, different from the first frequency range. The optical signal is coupled into the third delay element 40c, in this case from the second delay element 40c, where a third time delay is introduced on a third frequency range, different from the first or second frequency range. The optical signal is then coupled back via the second and first delay elements 40b, 40a, to the optical bus 45 and transmitted from output 50.

FIGS. 2 and 3 have described examples of the optical dispersion compensator 10 using three delay elements, e.g. micro-ring resonators. The optical dispersion compensation may be carried out using any number of delay elements, e.g. any number of micro-ring resonators. For example, the optical dispersion compensation may be carried out using a plurality of delay elements, e.g. 2, 3, 4, 5 or more delay elements. The set of delay elements may be coupled together in series or parallel. Each delay element may be considered as a compensator or an elementary compensator. An example implementation of the device is based on Silicon or Silicon Nitride micro-ring resonators, which are used as elementary compensating blocks. In some aspects, the optical dispersion compensator comprises an optical bus to which one or more of the delay elements is coupled, wherein the optical signal is delayed by each of the plurality of delay elements.

Figure 4:
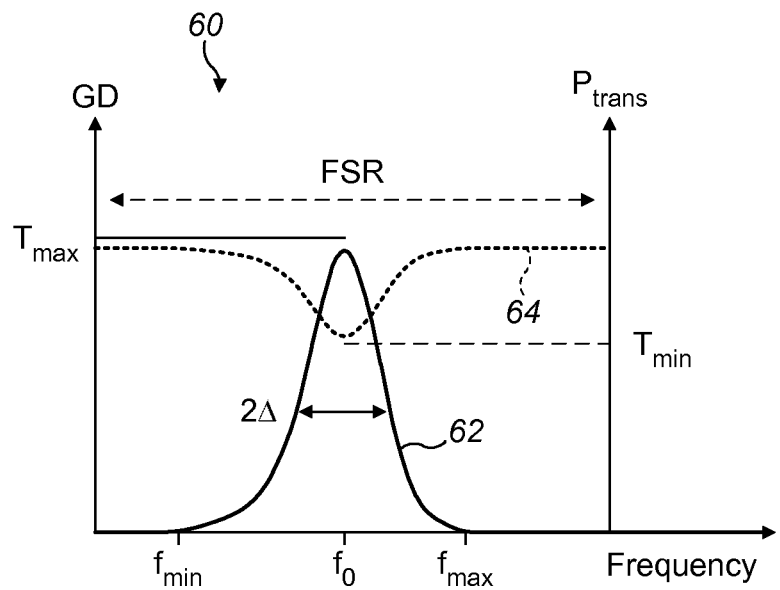
FIG. 4 schematically illustrates an example response of a micro-ring resonator in accordance with an embodiment.

FIG. 4 shows a diagram 60 indicating example optical properties of a micro-ring resonator for implementing a delay element 20, 40. The diagram indicates that a time delay 62 introduced by the micro-ring resonator is a function of frequency, and has a peak value of $T_{MAX}$ at a central frequency $f_0$. Each micro-ring resonator provides a time delay which has a periodic frequency response, which is bell-shaped within each period (the period is also known as free spectral range, FSR). Only one period is shown in diagram 60. As mentioned above, the delay element 20, 40 introduces a time delay on a frequency sub-band, i.e. between $f_{MAX}$ and $f_{MIN}$.

In FIG. 4, $f_{MAX}$ and $f_{MIN}$ indicate, respectively, the upper and lower bounds of a frequency interval centered on $f_0$ and having width equal to the FSR; $2\Delta$ is the full wave half maximum (FWHM) width of the bell curve. Within each period, a transmission power 64 has a minimum value ($T_{min}$) at the peak frequency $f_0$ and achieves higher values for frequencies above and below the peak value, up to a maximum transmission power value at $f_{MAX}$ and $f_{MIN}$.

Figure 5:
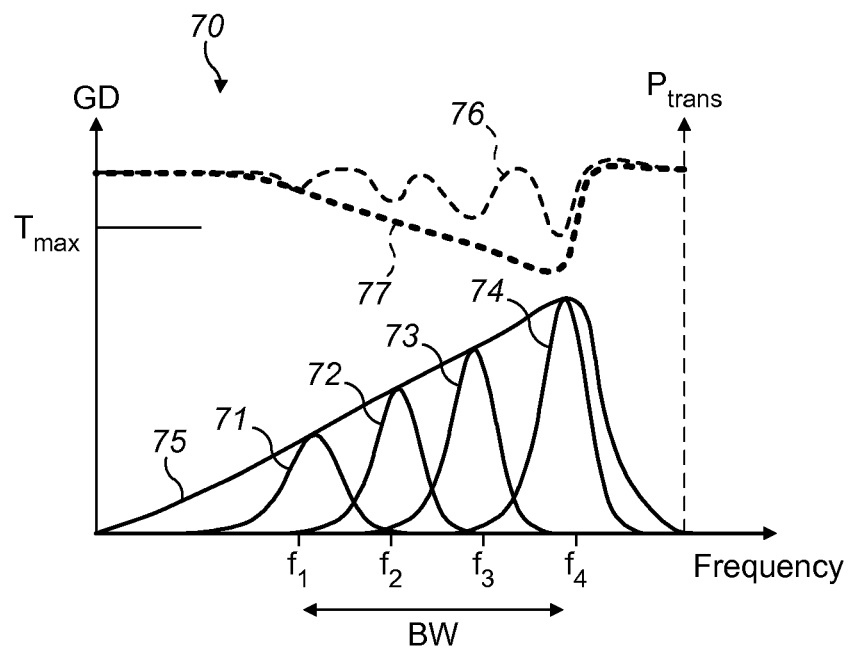
FIG. 5 schematically illustrates an example response of an optical dispersion compensator in accordance with an embodiment.

FIG. 5 shows a diagram 70 indicating example optical properties of a set of a plurality of delay elements 20; 40, e.g. micro-ring resonators for implementing the dispersion compensator 10. In this example, there are four delay elements 20; 40, for example arranged according to the example of FIG. 2 or 3.

The delay elements 20; 40 are each configured to provide a group delay response, labelled as 71, 72, 73, 74. The delay elements 20; 40 are configured to each have a different central frequency (corresponding to peak frequency $f_0$) at which there is a peak value of group time delay $T_{MAX}$. The central frequencies of the delay elements 20, 40 are labelled as $f_1$, $f_2$, $f_3$, $f_4$. The central frequencies may alternatively be considered as shifted or separated in frequency. Thus, each delay element 20, 40 has a central frequency in a different sub-band of the overall bandwidth BW for which dispersion compensation is provided.

As described above, the group delay response of each of the delay elements extends in frequency beyond the central frequency $f_1$, $f_2$, $f_3$, $f_4$. The separation of the central frequency $f_1$, $f_2$, $f_3$, $f_4$ is arranged such that the delay response of the delay elements is overlapping. For example, the sub-bands of the delay response of the delay elements partially overlap. As such, the time delay introduced is a combination of the delay response from a plurality (e.g. two) delay elements, for at least part of the bandwidth.

The group delay provided by the set of delay elements increases proportionally with frequency. In this example, the delay elements are arranged to introduce different amount of group delay (e.g. the maximum delays are different). For example, the delay elements are individually and differently attenuated. In particular, as the central frequency $f_1$, $f_2$, $f_3$, $f_4$ of a delay element increases, the maximum group delay provided by the delay element also increases.

The combined time delay from the set of the plurality of delay elements is arranged to be a predefined function 75, which compensates for the dispersion of the transmission medium.

In this example, the set of delay elements provides a linear group delay response 75. The cascaded group delay response is approximately linear over the whole compensation bandwidth. The group delay response 75 from the set of the delay elements increases substantially proportionally with increasing frequency.

In some aspects, the plurality of delay elements have a combined response providing a delay to the transmitted optical signal which varies with frequency. In some examples, the delay provided may be considered as a group delay. In some aspects, the optical dispersion compensator comprises a plurality of delay elements whose combined response introduces a group delay varying over a bandwidth of the optical signal, e.g. varying linearly over the signal bandwidth.

The delay elements may be tuned to control the delay characteristics. For example, the delay elements may be tuned by controlling two heaters, e.g. which vary a path length of the delay element (e.g. micro-ring resonator) and its power coupling coefficient to a waveguide (e.g. optical bus). The dispersion compensation, e.g. a delay amount and/or variation of delay with frequency (i.e. slope) may be controlled by controlling the delay elements. This control provides for compensating dispersion in a different length of optical fiber and/or compensating dispersion in an optical fiber having different dispersion characteristics. The required dispersion compensation may be measured or determined. The dispersion compensator is then configured by tuning of the set of delay elements.

A transmission power 76 is shown for the set of the delay elements. An overall approximation of the transmission power 77 is also shown, having a linear response, in which the transmission power decreases as the frequency (and compensating delay) increases. In some examples, the set of delay elements may be adjusted or tuned to compensate for the particular transmission medium, for example, to compensate for a particular length of optical fiber. In some examples, the individual attenuation values of the delay elements are adjusted. The attenuation values are adjusted to fix the chromatic dispersion slope (i.e. the variation in compensation delay versus the wavelength). For example, a response of each delay element is adjusted by regulating a coupling coefficient K of the micro-ring resonator to the optical bus or another micro-ring resonator. This determines the maximum delay provided by each micro-ring resonator, i.e. the peak values of the bell-shaped curves.

Figure 6:
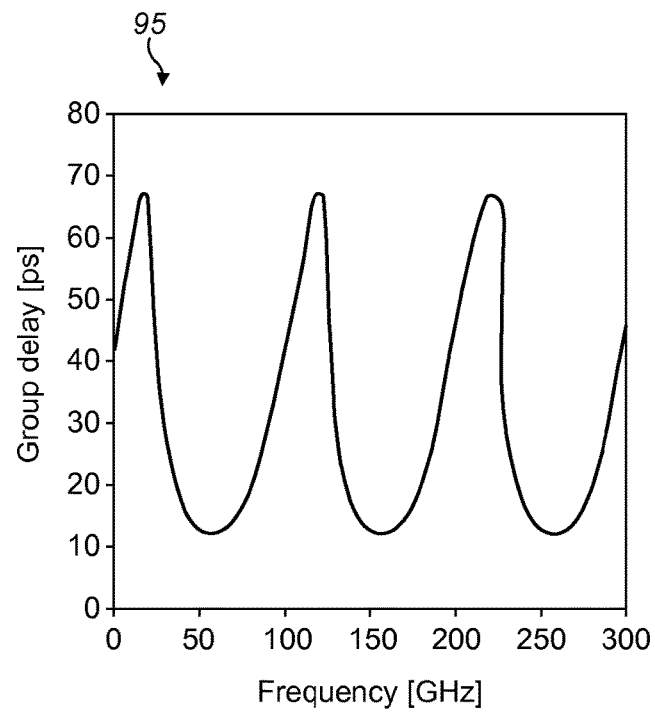
FIG. 6 schematically illustrates an example of a further response of an optical dispersion compensator in accordance with an embodiment.

FIG. 6 shows a diagram of a group delay 95. The group delay 95 shows the delay over a wide frequency range. Each peak corresponds to a group delay response 75a shown in FIG. 5, i.e. providing a delay which is dependent on frequency in order to compensate for the determined dispersion. The plurality of peaks shown indicates that the same delay elements, e.g. micro-ring resonators, provide for such dispersion compensation at plurality of frequency regions.

The free spectral range, FSR, of the group delay 95 (i.e. the frequency spacing around the peaks) may be adjusted. The FSR may be adjusted to be equal to a channel frequency spacing for transmission using a plurality of channels, e.g. a WDM or DWDM system. For example, the FSR is adjusted by thermally controlling a radius of the micro-ring resonator, in order to obtain a desired periodic frequency response. This allows the same dispersion compensator device to operate for all the channels in a DWDM system (i.e. DWDM comb). Thus, different variants of the device are not required for different wavelengths. The device may be considered as colorless.

Figure 7:
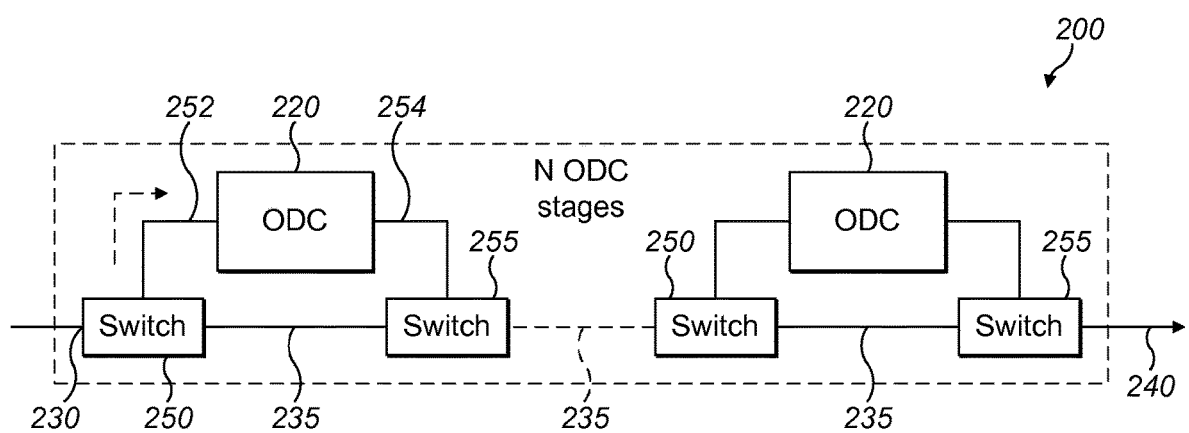
FIG. 7 schematically illustrates a further example of an optical dispersion compensator in accordance with an embodiment.

FIG. 7 shows an example of optical dispersion compensator 200, configured as part of a transmitter 1. The dispersion compensator 200 arranged to receive a controlled polarization from the optical light source.

The optical dispersion compensator 200 comprises a plurality of optical dispersion compensator units 220. Each optical dispersion compensator unit 220 is a set of delay elements 20, 40. An optical dispersion compensator unit 220 comprises a plurality of delay elements 20, 40, e.g. micro-ring resonators, as described for example in the embodiments of FIG. 2 or 3, in any suitable arrangement. An optical dispersion compensator unit 220 is configured to provide for a dispersion compensation of dispersion introduced to an optical signal, as described in any example of a dispersion compensator. An optical dispersion compensator unit 220 may be considered as corresponding to the described dispersion compensator 10, and may be implemented according to any example, e.g. as described with respect to FIG. 2 or 3. The optical dispersion compensator 200 may comprise any number N of a plurality of optical dispersion compensator units 220, e.g. 2, 3, 4, 5 or more.

The optical dispersion compensator 200 comprises an optical bus 235 configured to carry the optical signal from an input 230 to an output 240. The input 230 is connected to the optical light source 3 or modulator 5 of the transmitter 1. The output 240 may be considered as an output of the optical dispersion compensator 200. The optical bus 235 is separate to the optical bus 25, 45 within an optical dispersion compensator unit 220.

The optical bus 235 is connected to a plurality of first switches 250. A first switch 250 is configured to selectively couple or not couple the optical signal to an associated one of the optical dispersion compensator units 220. If the first switch 250 is controlled to couple the optical signal to the associated optical dispersion compensator unit 220, the optical signal is diverted from the optical bus 235 to the associated optical dispersion compensator unit 220 along a waveguide 252. The optical signal is diverted in its entirety, i.e. in this state there is no optical signal continuing along the optical bus 235 past the first switch 250. In a further state, the first switch 250 is controlled to not couple the optical signal to the associated optical dispersion compensator unit 220. In this case, the optical signal bypasses the associated optical dispersion compensator unit 220 and continues along the optical bus 235.

If the optical signal is transmitted through the optical dispersion compensator unit 220, a dispersion compensation delay is applied as described by the set of a plurality of delay elements. For example, the compensation delay shown in FIG. 5 is applied to the optical signal.

The optical dispersion compensator 200 further comprises second switches 255. The second switches 255 are controlled to couple an optical signal output by the optical dispersion compensator unit 220 (i.e. from output 30; 50) on a waveguide 254 to the optical bus 235, in the direction of the output 240. For an optical signal which bypassed the associated optical dispersion compensator unit 220, the second switch 255 is controlled to allow the optical signal to continue along the optical bus 235.

A first and second switch 250, 255 is associated with a plurality of the optical dispersion compensator units 220, e.g. each of the optical dispersion compensator units 220.

An optical dispersion compensator unit 220 which receives the optical signal and provides dispersion compensation may be considered as activated. An optical dispersion compensator unit 220 which is bypassed may be considered as inactivated or deactivated. In this example, the activation or deactivation of a particular optical dispersion compensator unit 220 is controlled by at least the associated first switch 250, and optionally implemented also using the associated second switch 255.

The optical dispersion compensator 200 is configured to selectively apply dispersion compensation using one or more of the plurality of optical dispersion compensator unit 220, for example, by control of the first and second switches 250, 255. The optical dispersion compensator 200 may be controlled to route the optical signal into none, or one or more, optical dispersion compensator units 220. Each optical dispersion compensator unit 220 may be independently inactivated or deactivated. For example, each of the first switches 250 is independently controllable. In some examples, the second switch 255 operates in a state corresponding to the associated first switch 250. As such, the dispersion compensator is configured to selectively activate one or more of the optical dispersion compensator units 220.

The optical dispersion compensator 200 is configured to provide a controllable dispersion compensation to a received optical signal. By selecting a number, or which, of the optical dispersion compensator unit 220 are activated, a controllable amount of dispersion compensation can be provided. The amount of dispersion compensation is a sum of the dispersion compensation from the activated optical dispersion compensator unit(s) 220. For example, if the optical dispersion compensator 200 comprises four optical dispersion compensator units 220, two optical dispersion compensator unit 220 may be activated to provide a required amount of optical dispersion compensation.

The required amount of dispersion compensation may depend on a length of transmission medium, e.g. optical fiber, and dispersion characteristics of the transmission medium, along which the optical signal will be transmitted. The fiber length and/or characteristics may be determined to have a value by measurement or configuration. For example, each optical dispersion compensator unit 220 is configured to compensate for 10 km of optical fiber. For a 20 km fiber length, the optical dispersion compensator 200 is configured to activate two optical dispersion compensator units 220. Any further optical dispersion compensator units 220 are deactivated, i.e. bypassed, such that the deactivated optical dispersion compensator unit 220 do not contribute to the dispersion compensation.

In some examples, each of the optical dispersion compensator unit 220 provides a same dispersion compensation. For example, each optical dispersion compensator unit 220 compensates for 10 km of optical fiber. Alternatively, one or more of the optical dispersion compensator unit 220 provide a different amount of dispersion compensation to another dispersion compensator unit 220. Thus, the required amount of dispersion compensation may be achieved by selecting a required number of activated dispersion compensator unit 220 and/or selecting one or more particular ones of the dispersion compensator units 220 as activated.

Figure 8A:
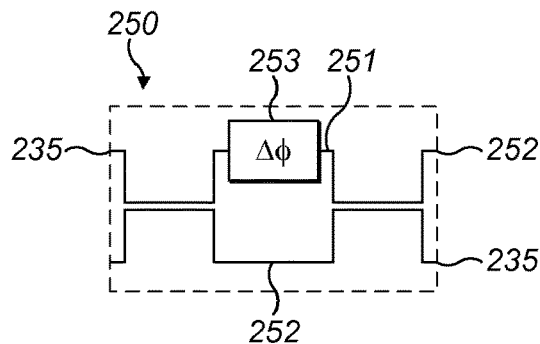
FIGS. 8a and 8b schematically illustrates a further example of a part of an optical dispersion compensator in accordance with an embodiment.

FIG. 8a shows an example implementation of a first switch 250. The first switch 250 may be implemented using a Mach-Zehnder interferometer. The first switch 250 comprises a single input, from the optical bus 235. The switch 250 splits the received signal into a first arm 251 and a second arm 252. A phase difference unit 253 is configured to apply a phase delay between the optical signal in the first and second arms 251, 252. The phase difference unit 253 may be implemented on the first arm 251 as shown, or on the second arm (not shown) or both first and second arms (not shown). The phase difference unit 253 controls a relative phase between the first and second arms to introduce a constructive or destructive interference at a selected one of the outputs to the waveguide 252 or to the optical bus 235. Thus, the switch 250 outputs the optical signal to one of the waveguide 252 or the optical bus 235.

Figure 8B:
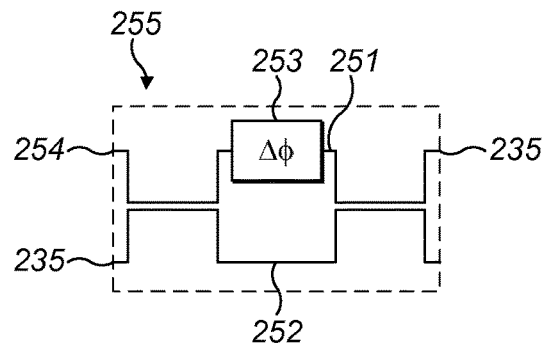

FIG. 8b shows an example implementation of a second switch 255. The second switch 255 may be implemented using a Mach-Zehnder interferometer. The second switch 255 has substantially the same construction as the first switch 250, but configured with two inputs and one output. The second switch 255 comprises a first input from waveguide 254 and a second input from the optical bus 235. The switch 255 couples and then splits the received signals into a first arm 251 and a second arm 252. A phase difference unit 253 is configured to apply a phase delay between the optical signal in the first and second arms 251, 252. The phase difference unit 253 may be implemented on the first arm 251 as shown, or on the second arm (not shown) or both first and second arms (not shown). The second switch 255 has a single output to the optical bus 235. The phase difference unit 253 controls a relative phase between the first and second arms to introduce a constructive or destructive interference, to select one of the inputs 254, 235 to output to the optical bus 235. Thus, the switch 250 outputs the optical signal from one of the waveguide 254 or the optical bus 235. Alternatively, the second switch 255 may be replaced by a coupler which couples any optical signal from either the optical bus 235 or the waveguide 253 onto the optical bus 235 in the direction of the output 240.

Figure 9:
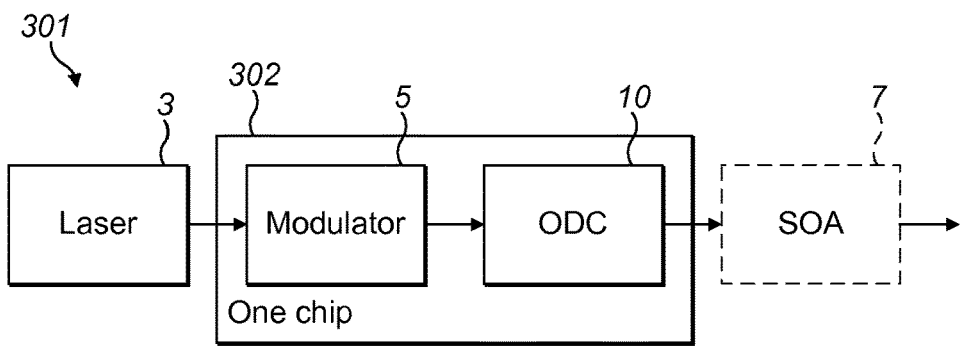
FIG. 9 schematically illustrates a further example of a transmitter in accordance with an embodiment.

FIG. 9 shows a further example of transmitter 301. In this example, the transmitter comprises the optical light source 3, modulator 5, optical dispersion compensator 10 and optionally SOA 7, as described in any example. The modulator 5 and optical dispersion compensator 10 are formed on a same integrated circuit 302, which may also be considered as a photonics integrated circuit, chip or monolithic chip. The optical light source 3 is external to the integrated circuit 302. For example, the optical light source 3 is coupled to the integrated circuit 302 by a polarization maintaining fiber. If present, the SOA 7 is external to the integrated circuit 302, e.g. coupled to the integrated circuit 302 by a polarization maintaining fiber. Alternatively, one of the optical light source 3 and SOA 7 is external to the integrated circuit 302, and the other one is integrated with the integrated circuit 302.

Figure 10:
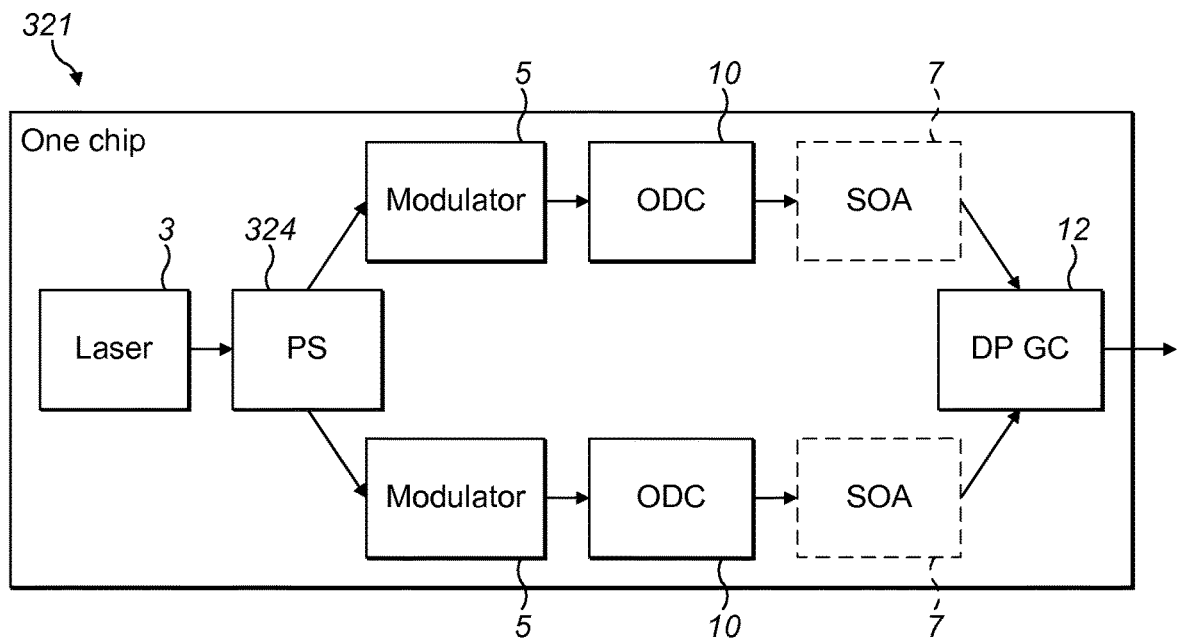
FIG. 10 schematically illustrates a still further example of a transmitter in accordance with an embodiment.

FIG. 10 shows a further example of a transmitter 321. In this example, the transmitter 321 is a dual polarization transmitter. The transmitter 321 is configured to transmit an optical signal having a plurality of polarization modes, e.g. two polarization modes. In this example, two polarizations can be handled independently by separate optical dispersion compensators according to any example. This is in contrast to the earlier examples, in which the optical dispersion compensator has been described with respect to handling a single polarization.

The transmitter 321 comprises an optical light source 3, as described in any example.

The transmitter 321 further comprises a polarization splitter 324. The polarization splitter 324 is configured to receive light from the optical light source 3. The optical light source 3 is configured to generate a single linear polarization. The polarization splitter 324 is configured to split the received single linear polarization into different polarization modes, e.g. into two component polarizations, e.g. orthogonal polarizations. Each polarization mode is a single, defined, polarization, e.g. which is known and is constant. The polarization splitter 324 is configured to output the different polarizations to different outputs. As such, the polarization splitter separates the polarization modes. This provides for separate handling of the different polarizations.

The separated optical polarization modes are processed separately by separate components, which may or may not be integrated into the same integrated circuit. The transmitter comprises, for each polarization mode, a modulator 5, an optical dispersion compensator 10 and optionally a SOA 7, according to any described example. The optical signals for each polarization mode, having been modulated, dispersion compensated and optionally amplified by the SOA 7, are combined in a coupler 12, e.g. a dual polarization Grating Coupler, DP GC. The coupler 12 may be considered as a multiplexer. The transmitter 321 is configured to transmit a combined output of the plurality of polarization modes, e.g. over an optical fiber to a receiver.

Figure 11:
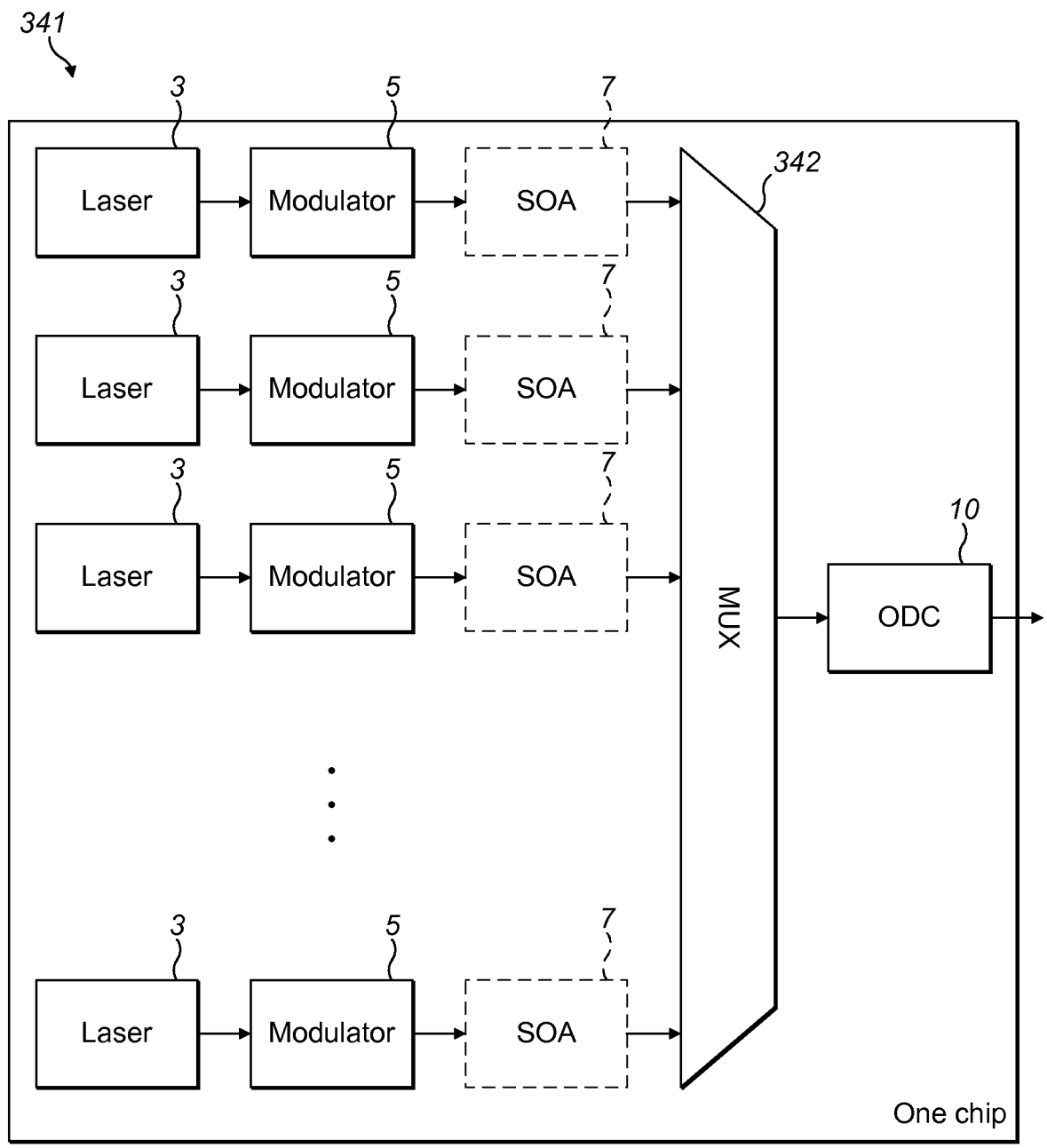
FIG. 11 schematically illustrates a still further example of a transmitter in accordance with an embodiment.

FIG. 11 shows a further example of a transmitter 341. The transmitter 341 is configured as a transmitter array. The transmitter 341 is configured to transmit a plurality of optical signals at different wavelengths.

The transmitter 341 comprises a plurality of optical light sources 3, as described in any example. Each optical light source 3 outputs light to a modulator 5, or the optical light source is directly modulated, to output a modulated optical signal. Optionally, the transmitter 341 comprises a plurality of SOA 7, each SOA configured to amplify a modulated optical signal. In this example, the optical light sources 3 are configured to generate light at different wavelengths. The transmitter 341 comprises a multiplexer 342 configured to multiplex together by the optical signals. In some examples, the transmitter 341 further comprises an optical dispersion compensator 10, arranged to receive the multiplexed optical signal. The optical dispersion compensator 10 provides dispersion compensation, i.e. chromatic dispersion compensation for the plurality of optical signals, according to any example. The single optical dispersion compensator 10 is shared by all channels of the transmitter array. In this example, it is important to ensure that all the optical light sources 3 (e.g. laser) emit on the same polarization state, aligned with the main mode of the optical dispersion compensator 10.

For example, the optical dispersion compensator 10, 200 has a periodic frequency response as shown in FIG. 6, corresponding to a periodic frequency separation of the plurality of optical signals. In an alternative example, the transmitter 341 comprises a separate optical dispersion compensator 10, 200 for each optical signal.

The transmitter 321, 341 has the component parts, e.g. optical light source, polarization splitter, modulator, optical dispersion compensator, SOA and coupler, integrated in the same integrated circuit, e.g. a hybrid circuit or chip. Alternatively, one or more of the component parts may be external to an integrated circuit in which the optical dispersion compensator is formed, e.g. the optical light source and/or SOA as described for FIG. 9.

The embodiments described have the feature that the optical dispersion compensator is integrated at the transmitter. In some aspects, the optical transmitter may be considered as having an optical light source integrated with the optical dispersion compensator of any example. The integration may be arranged such that a polarization of the optical light source is maintained. For example, the integration of the optical dispersion compensator and optical light source may be by being on the same chip, or by a connection with a polarization maintaining fiber. In the described examples, integration of the optical dispersion compensator at the transmitter provides for a single polarization design of transmitter. In some aspects, the optical light source provides a single polarization. In some aspects, the optical light source may be considered as providing a single polarization for the or each optical dispersion compensator, e.g. by considering for FIG. 10 that the polarization splitter provides a single polarization for each optical dispersion compensator. The transmitter may be configured with the polarization of the optical light source aligned with a propagation mode of the optical dispersion compensator. As such, a propagation mode of the optical dispersion compensator is aligned in polarization to an optical light source providing an optical signal to the optical dispersion compensator. For example, a Transverse Electric, TE mode of the optical dispersion compensator may be aligned to the optical light source (e.g. laser) polarization. This alignment is possible since the optical light source and optical dispersion compensator are both at the transmitter. This provides for a simplified design for providing chromatic dispersion compensation.

Figure 12:
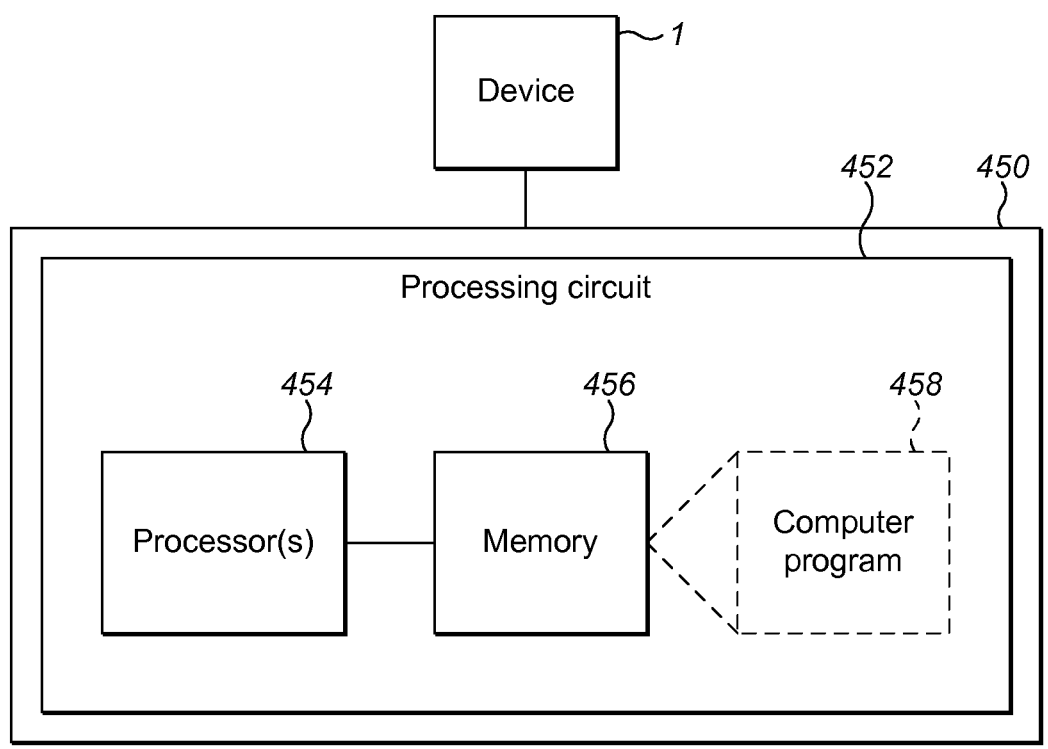
FIG. 12 schematically illustrates an example of a controller and transmitter in accordance with an embodiment.

FIG. 12 shows a controller 450 configured to control the transmitter 1 according to an example of the disclosure. For example, the controller 450 is configured to control the selective activation of one or more of the optical dispersion compensation units as described with respect to FIG. 7. The controller 450 is configured to control an amount of dispersion compensation applied at the transmitter 1. For example, the controller is configured to transmit control signals to the transmitter 1 (also termed the device). In some examples, the controller 450 may control a tuning of the delay elements, in order to control the amount of dispersion compensation, e.g. by controlling a temperature of the delay elements (thermal control) or selective activation of one or more dispersion compensator units 220. An aspect of the disclosure also relates to a method of operating the controller 450 to control an amount of dispersion compensation, and a system of the transmitter 1 and controller 450. In some examples, the transmitter 1,200 of any example comprises, or is controlled by, the controller 450.

In some examples, the controller 450 comprises one or more processing circuits 452, which may also be referred to as processors or processing circuitry. The processing circuit 452 comprises, for example, one or more digital processors 454, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. The processor(s) 454 of the processing circuit 452 may execute a computer program 458 stored in a memory 456 that configures the processor(s) 454. More generally, the processing circuit 452 may comprise fixed circuitry, or programmable circuitry that is specially configured via the execution of program instructions implementing the functionality taught herein, or may comprise some mix of fixed and programmed circuitry. The processor 454 may be multi-core. The controller 450 may be integrated or connected with any example of the transmitter 1,200, in order to control the dispersion compensation applied at the transmitter.

Figure 13:
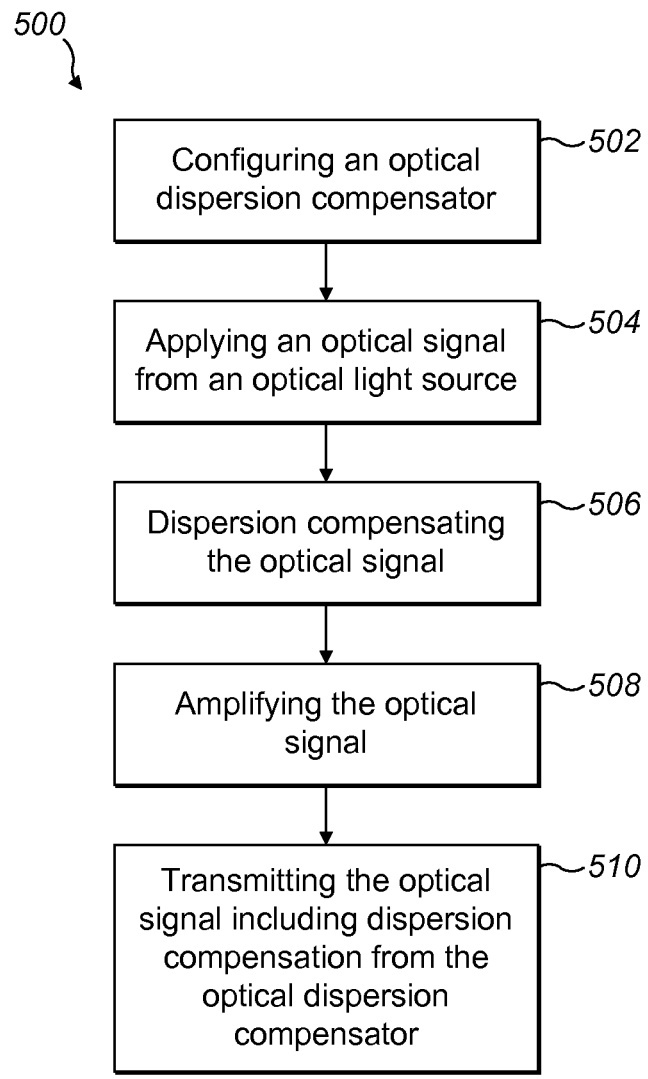
FIG. 13 schematically illustrates a method of transmitting an optical signal in accordance with an embodiment.

FIG. 13 shows an example method 500 of transmitting an optical signal with dispersion compensation. In general, the optical signal may be a single optical channel or may be a WDM signal. In some examples, the transmitter is configured for point to point applications, e.g. a Digital Unit (DU) or Remote Radio Unit (RRU) interconnected in a radio access network. If the optical signal is a WDM signal, the WDM wavelengths are generated in the same place and the transmission of the wavelengths has all of the wavelengths aligned in polarization.

The method 500 comprises configuring 502 an optical dispersion compensator of any example to provide a determined amount of dispersion compensation. In some examples, the configuring is by selectively activating one or more of the optical dispersion compensator units 220 to provide the determined amount of dispersion compensation. In other examples, the configuring is by controlling a temperature of the delay elements, e.g. thermal tuning of the delay elements to provide the determined chromatic dispersion compensation of the optical signal. In some examples, the configuring is carried out at installation, and not changed or manually changed during use. In that example, the configuring is static or semi-static. In other examples, the configuring comprises changing the configuration during use, e.g. as controlled by signalling or by a determination of the required chromatic dispersion compensation. In some examples, a required amount of dispersion compensation to be applied is determined or obtained. The determination or obtaining may be by carrying out measurements of the chromatic dispersion received at a receiver, the controller receiving an indication of that measurement. Alternatively, the determination or obtaining may be by receiving signalling indicating an amount of chromatic dispersion compensation which should be applied at the transmitting, e.g. from a manual entry or any type of measurement. For example, the configuration may be carried out under the control of the controller 450. The transmitter may receive configuration signals from the controller to provide for the configuration.

In 504, the method comprises applying an optical signal from an optical light source to the dispersion compensator. For example, the optical light source generates light, (e.g. a modulated optical signal) which is received at the optical dispersion compensator. The applied optical signal can be dispersion compensated.

In 506, the method comprises dispersion compensating the optical signal in the dispersion compensator. For example, the delay elements in the form of micro-ring resonators carry and output the optical signal with a time delay corresponding to chromatic dispersion compensation, i.e. the added time delay is dependent on frequency. In some aspects, the dispersion compensating the optical signal in the optical dispersion compensator with the plurality of delay elements having a combined response provides a delay to the transmitted optical signal which varies with frequency.

In 508, optionally, the method comprises amplifying the optical signal with optical dispersion compensation, e.g. using the SOA 7 of any example.

In 510, the method comprises transmitting the optical signal including dispersion compensation from the optical dispersion compensator.

Figure 14:
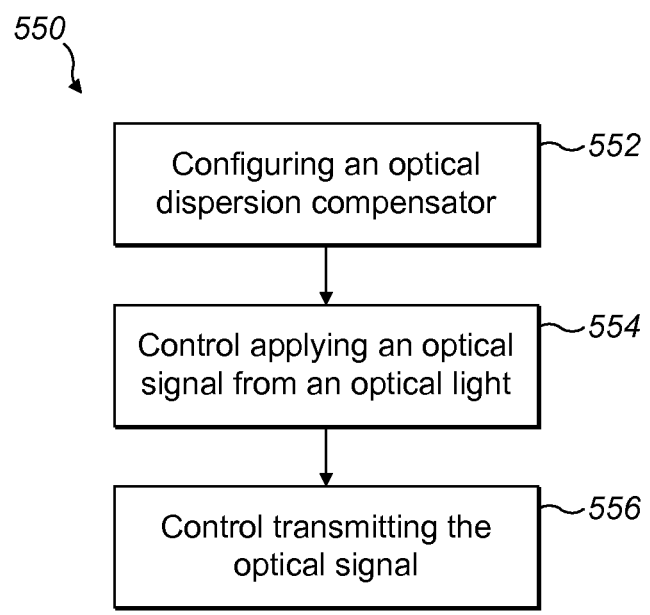
FIG. 14 schematically illustrates a method of controlling a transmitting an optical signal in accordance with an embodiment.

FIG. 14 shows an example method 550 of controlling a transmitter configured to transmit an optical signal according to any example.

For example, the method 550 is implemented in the controller 450, which may be integrated with, co-located with or remote from the transmitter 1. The method may be at least partially implemented by processing circuitry 454 and/or memory 456 of the controller 450. In some examples, the method 550 is implemented by a computer program comprising computer code when run on processing circuitry of the controller 450. In some examples, a computer program product comprises the computer program which carries out the method 550. The controller may operate independently, or may be controlled by a separate, or central, controller. For example, the controller 450 is provided with an amount of dispersion compensation to apply by software, e.g. signalling from the separate, or central, controller, or from a manual change to a software value stored by the controller.

In 552, the method comprises configuring a dispersion compensator in the transmitter to provide a determined amount of dispersion compensation. For example, the controller transmits control signals to the transmitter, e.g. to the optical dispersion compensator. The controller may store values or configuration settings for implementing the configuration. These settings may be constant until changed manually or by a received signalling, e.g. from a remote controller. The configuring includes configuring of the delay elements (e.g. by thermal tuning) or by selectively activating one or more optical dispersion compensator units. The configuring may occur continuously or periodically, or only when a change is required, e.g. to maintain a set chromatic dispersion compensation or change the chromatic dispersion compensation. The configuring the optical dispersion compensator may be considered as controlling of dispersion compensating the optical signal in the dispersion compensator.

In 554, the method controls applying an optical signal from an optical light source to the dispersion compensator for dispersion compensating the optical signal in the dispersion compensator. For example, the controller controls the optical light source to start transmitting or controls one or more wavelengths at which the optical light source transmits. In some examples, the method comprises controlling a modulation of the optical signal using the modulator 5.

In 556, the method controls transmitting the optical signal including dispersion compensation from the dispersion compensator. The dispersion compensating the optical signal in the optical dispersion compensator is with the plurality of delay elements having a combined response to provide a delay to the transmitted optical signal which varies with frequency. In some examples, the transmission may comprise controlling an amplification of the optical signal using the SOA 7.

A further aspect of the disclosure is a computer program, or a computer program product or carrier comprising the computer program, operable to provide for the control of the transmitter of any example.

Examples of the disclosure may relate to any combination of described examples. For example, a dispersion compensator comprising a plurality of optical dispersion compensator units which may be selectively activated or deactivated to control the compensation dispersion is applicable to a device having a single dispersion compensator (as shown in FIG. 1) or a device comprising a plurality of such dispersion compensators. The optical dispersion compensation may be carried out using a controllable number of one or more of a plurality of optical dispersion compensation units, e.g. 2, 3, 4, 5 or more optical dispersion compensation units.

Aspects of the disclosure provide for any a transmitter or a system comprising a transmitter, receiver and/or optical transmission medium (e.g. optical fiber).

Aspects of the present disclosure have advantages over known solutions for optical dispersion compensation. For example, compared to in line optical dispersion compensation, no additional amplifiers or in line devices are needed or different variants to be managed. Compared to electronic equalization, the solution is much more energy efficient and does not require expensive coherent interfaces. Compared to electronic pre-distortion, the solution is much more energy efficient (no DAC) and compatible with high speed interfaces, above 10 Gbit/s. Compared to integrated optical dispersion at the receiver, no dual polarization or polarization controller are needed. Compared to dispersion tolerant modulation formats, the achievable length is higher. Note that the device is independent on the modulation format and can be used to extend the reach of any modulation format.

ABBREVIATIONS

| Abbreviation | Explanation |
| --- | --- |
| CAPS | Combined Phase Amplitude Shift |
| DAC | Digital to Analog Conversion |
| DCF | Dispersion Compensating Fiber |
| DWDM | Dense Wavelength Division Multiplexing |
| DMT | Discrete Multi-Tone |
| DP GC | Dual Polarization Grating Coupler |
| EDFA | Erbium Doped Fiber Amplifier |
| FBG | Fiber Bragg Grating |
| IQ | In phase, in Quadrature |
| LC | Liquid Crystal |
| ODC | Optical Dispersion Compensator |
| OOK | On Off Keying |
| SOA | Semiconductor Optical Amplifier |
| PAM-4 | $4^{th}$ order Dual Polarization Grating Coupler |

The invention claimed is:

1. A transmitter configured to transmit an optical signal, the transmitter comprising:
    an optical dispersion compensator configured to compensate for chromatic dispersion of the optical signal;
    wherein the optical dispersion compensator comprises a plurality of delay elements, each configured to provide a delay at a different frequency;
    wherein the different frequency responses of the plurality of delay elements combine to yield a combined delay response providing a delay to the transmitted optical signal which continuously varies over a frequency range spanning the delay element response frequencies; and
    wherein the combined delay response is periodic, and wherein a period of the combined delay response equals a channel frequency spacing.

2. The transmitter of claim 1, wherein a first delay element of the plurality of delay elements is a micro-ring resonator.

3. The transmitter of claim 1, wherein a first delay element of the plurality of delay elements is configured to apply a delay to a sub-band of the optical signal.

4. The transmitter of claim 1, wherein the optical dispersion compensator is configured to apply a delay to the optical signal which varies substantially linearly with frequency.

5. The transmitter of claim 1, wherein a propagation mode of the optical dispersion compensator is aligned in polarization to an optical light source providing an optical signal to the optical dispersion compensator.

6. The transmitter of claim 1:
    wherein the optical dispersion compensator comprises a plurality of optical dispersion compensator units;
    wherein each optical dispersion compensator unit comprises a plurality of the delay elements; and
    wherein the optical dispersion compensator is configured to selectively activate one or more of the optical dispersion compensator units.

7. The transmitter of claim 6:
    wherein the optical dispersion compensator comprises a first switch associated with each optical dispersion compensator unit;
    wherein the first switch is configured to be controllable to couple the optical signal with the associated optical dispersion compensator unit to activate the optical dispersion compensator unit.

8. The transmitter of claim 7, wherein the first switch is configured to selectively couple the optical signal with the associated optical dispersion compensator unit to activate the optical dispersion compensator unit or to couple the optical signal to an optical bus to bypass the optical dispersion compensator unit.

9. The transmitter of claim 1, wherein the transmitter further comprises: an optical light source, a modulator, and/or an amplifier.

10. The transmitter of claim 1, wherein the optical dispersion compensator is implemented in an integrated circuit.

11. A method of transmitting an optical signal with optical dispersion compensation, the method comprising:
    configuring an optical dispersion compensator to provide a determined amount of dispersion compensation; wherein the optical dispersion compensator comprises a plurality of delay elements, each configured to provide a delay at a different frequency;
    applying an optical signal from an optical light source to the optical dispersion compensator;
    dispersion compensating the optical signal in the optical dispersion compensator with the different frequency responses of the plurality of delay elements combining to yield a combined delay response to provide a delay to the transmitted optical signal which continuously varies over a frequency range spanning the delay element response frequencies; and
    transmitting the optical signal including dispersion compensation from the optical dispersion compensator;
    wherein the combined delay response is periodic, and wherein a period of the combined delay response equals a channel frequency spacing.

12. The method of claim 11, wherein a first delay element of the plurality of delay elements applies a delay to a sub-band of the optical signal.

13. The method of claim 11, wherein a first delay element of the plurality of delay elements is a micro-ring resonator.

14. The method of claim 11, wherein the optical dispersion compensator applies a delay to the optical signal which varies substantially linearly with frequency.

15. The method of claim 11:
    wherein the optical dispersion compensator comprises a plurality of optical dispersion compensator units;
    wherein each optical dispersion compensator unit comprises a plurality of the delay elements; and
    wherein the configuring the optical dispersion compensator comprises selectively activating one or more of the optical dispersion compensator units to provide the determined amount of dispersion compensation.

16. The method of claim 15, wherein the selectively activating one or more of the optical dispersion compensator units comprises controlling a first switch associated with each optical dispersion compensator unit, wherein the first switch is controlled to couple the optical signal with the associated optical dispersion compensator unit to activate the optical dispersion compensator unit.

17. A controller configured to control a transmitter configured to transmit an optical signal; the transmitter comprising an optical dispersion compensator configured to compensate for chromatic dispersion of the optical signal; the controller comprising:

processing circuitry configured to cause the controller to:

configure the dispersion compensator in the transmitter to provide a determined amount of dispersion compensation; wherein the dispersion compensator comprises a plurality of delay elements, each configured to provide a delay at a different frequency; wherein the different frequency responses of the plurality of delay elements combine to yield a combined delay response to provide a delay to the transmitted optical signal which continuously varies over a frequency range spanning the delay element response frequencies;

control applying an optical signal from an optical light source to the dispersion compensator for dispersion compensating the optical signal in the dispersion compensator; and control transmitting the optical signal including dispersion compensation from the dispersion compensator;

wherein the combined delay response is periodic, and wherein a period of the combined delay response equals a channel frequency spacing.

18. A method of a controller configured to control a transmitter configured to transmit an optical signal; the transmitter comprising an optical dispersion compensator configured to compensate for chromatic dispersion of the optical signal; the method comprising the controller:

configuring a dispersion compensator in the transmitter to provide a determined amount of dispersion compensation; wherein the dispersion compensator comprises a plurality of delay elements, each configured to provide a delay at a different frequency, wherein the different frequency responses of the plurality of delay elements combine to yield a combined delay response to provide a delay to the transmitted optical signal which continuously varies over a frequency range spanning the delay element response frequencies; and controlling applying an optical signal from an optical light source to the dispersion compensator for dispersion compensating the optical signal in the dispersion compensator; and controlling transmitting the optical signal including dispersion compensation from the dispersion compensator;

wherein the combined delay response is periodic, and wherein a period of the combined delay response equals a channel frequency spacing.

* * * * *